(12) United States Patent
Calhoun et al.

(10) Patent No.: US 9,292,301 B1
(45) Date of Patent: Mar. 22, 2016

(54) SYSTEMS, METHODS, AND APPARATUS FOR CONTROLLING THE POWER-ON OR BOOT SEQUENCE OF AN INTEGRATED CIRCUIT BASED ON POWER HARVESTING CONDITIONS

(71) Applicant: PsiKick, Inc., Charlottesville, VA (US)

(72) Inventors: Benton H. Calhoun, Charlottesville, VA (US); David D. Wentzloff, Ann Arbor, MI (US)

(73) Assignee: PsiKick, Inc., Charlottesville, VA (US)

( * ) Notice: Subject to any disclaimer, the term of this patent is extended or adjusted under 35 U.S.C. 154(b) by 0 days.

(21) Appl. No.: 14/679,748

(22) Filed: Apr. 6, 2015

(51) Int. Cl.
*G06F 9/44* (2006.01)
*G06F 1/26* (2006.01)

(52) U.S. Cl.
CPC ................ *G06F 9/4401* (2013.01); *G06F 1/26* (2013.01)

(58) Field of Classification Search
CPC .................................. G06F 9/4401; G06F 1/26
See application file for complete search history.

(56) References Cited

U.S. PATENT DOCUMENTS

| | | | |
|---|---|---|---|
| 5,018,062 A | 5/1991 | Culler et al. | |
| 6,202,091 B1 * | 3/2001 | Godse | G06F 9/4408 709/220 |
| 2013/0054945 A1 * | 2/2013 | Free | G06F 1/3203 713/2 |
| 2013/0080755 A1 * | 3/2013 | Lin | G06F 9/4401 713/2 |
| 2013/0227261 A1 * | 8/2013 | Anderson | G06F 9/4401 713/2 |
| 2015/0046692 A1 | 2/2015 | Shin | |

OTHER PUBLICATIONS

Minami, Masateru, et al. "Solar Biscuit: A Battery-less Wireless Sensor Network System for Environmental Monitoring Applications." The 2nd International Workshop on Networked Sensing Systems. 2005. 6 pages.
Chou, Pai H., et al. "Techniques for Maximizing Efficiency of Solar Energy Harvesting Systems (Invited Paper)." Proceedings of the 5th Conference on Mobile Computing and Ubiquitous Networking. 2010. 7 pages.
Chen, Chien-Ying et al. "DuraCap: a Supercapacitor-Based, Power-Bootstrapping, Maximum Power Point Tracking Energy-Harvesting System." Proceedings of the 16th ACM/IEEE international symposium on Low power electronics and design. ACM, 2010. 6 pages.
Zhang, Fan et al. "A Batteryless 19µW MICS/ISM-Band Energy Harvesting Body Area Sensor Node SoC." IEEE International Solid-State Circuits Conference, 2012. 3 pages.
Zhang, Yanqing et al. "A Batteryless 19µW MICS/ISM-Band Energy Harvesting Body Area Sensor Node SoC for ExG Applications." IEEE Journal of Solid-State Circuits, vol. 48, No. 1, Jan. 2013. pp. 199-213.

* cited by examiner

*Primary Examiner* — Stefan Stoynov
(74) *Attorney, Agent, or Firm* — Cooley LLP (57) ABSTRACT

In some embodiments, an apparatus includes an integrated circuit such as a system on chip that operates in part from harvested power and that uses information about power harvesting conditions to alter a power-on sequence or boot sequence based on that information. In some embodiments, a method uses information about power harvesting and energy harvesting conditions to alter a power-on sequence or boot sequence.

13 Claims, 4 Drawing Sheets

SYSTEMS, METHODS, AND APPARATUS FOR CONTROLLING THE POWER-ON OR BOOT SEQUENCE OF AN INTEGRATED CIRCUIT BASED ON POWER HARVESTING CONDITIONS

BACKGROUND

Some embodiments described herein relate generally to the methods and apparatus for using information related to power harvesting conditions to alter the power-on sequence or boot sequence of an integrated circuit such as a system-on-chip (SoC).

Portable systems that operate from a battery and/or from power harvested from the environment typically consume small amounts of energy to prolong the system lifetime for a given amount of available energy. The energy budget for a portable system affects a widening set of applications due to a combination of design criteria for smaller size (less battery volume, so less energy available), longer lifetimes (make energy last longer), and/or more functionality (do more with the same amount of energy). An emerging class of these portable systems can be used as wireless nodes in a variety of applications, including providing monitoring, sensing, control, or security functions. An increasing fraction of attention to these sorts of devices, often classified as belonging to the emerging "Internet of Things (IoT)", considers that they will typically operate at least in part using power harvested from their environment, and a new class of power harvesting systems on chip (SoCs) has emerged for this purpose. These SoCs may include combinations of power harvesting circuits, power management circuits, sensors or sensor interfaces, processing components (e.g. microcontrollers, microprocessors, digital signal processors, hardware accelerators), memory, and wireless communication circuits (e.g. radios).

SoCs with embedded processing elements typically follow a startup sequence that governs how they turn on and configure different components in the system and how the processors themselves boot into an operational state. The startup sequence is usually governed by hardware with some degree of programmability using software. The boot sequence of the processor usually executes code in a read only memory (ROM) (other options in place of the ROM include one-time programmable memory (OTP), multiple-time programmable memory (MTP), programmable ROM (PROM), electrically erasable PROM (EEPROM), and other various types of non-volatile memory (NVM)). The code in the ROM provides a way for the application that will eventually run on the processor to initialize itself and start executing. This boot sequence often includes the initialization of interrupt handlers or exception vectors, initialization of the stack, initialization of the memory system and of registers, peripheral initialization, configuration of I/O devices, security handling, interrupt enabling, processor mode configuration, variable initialization, (if no application code is available) boot loading of application code from an external source, and finally, jumping to the main application code.

The variable conditions inherent to power harvesting systems may result in situations in which the conventional methods for booting an integrated circuit such as an SoC significantly degrade the system's ability to provide reliable or long term functionality. Thus, a need exists for methods and implementations that allow energy harvesting systems to boot reliably across a range of power harvesting conditions.

SUMMARY

In some embodiments, an apparatus includes an integrated circuit such as a system on chip that operates in part from harvested power and that uses information about power harvesting conditions to alter a power-on sequence or boot sequence based on that information. In some embodiments, a method uses information about power harvesting and energy harvesting conditions to alter a power-on sequence or boot sequence.

DETAILED DESCRIPTION

Integrated circuits (ICs) that consume low enough power to allow them to operate from energy harvested from their environment provide a compelling solution for wireless sensing in the Internet of Things. Many of the known approaches to operating microelectronics systems assume the presence of a battery or other similarly reliable and continuous source of power, which is not typically the case in energy harvesting systems.

Figure 1:
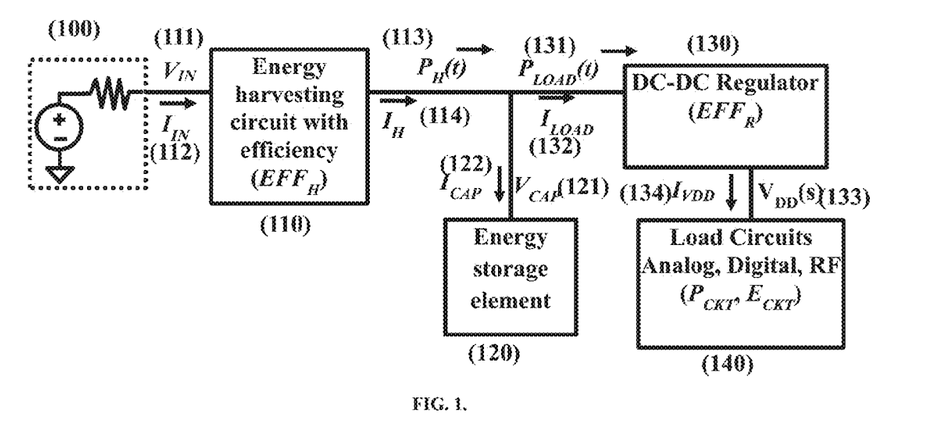
FIG. 1 is a block diagram of an energy harvesting system according to an embodiment. Power harvested from the environment ($P_H(t)$) is delivered to a storage node, which stores energy ($E_{Storage}$) for later use in the system. The circuits in the system draw current that imposes some load power ($P_{LOAD}(t)$) that is drawn from the storage element.

FIG. 1 is a block diagram of an energy harvesting system, according to an embodiment. As shown in FIG. 1, harvesting source 100 is connected or operably coupled to energy harvesting circuit 110. The harvesting source 100 can be, for example, a photovoltaic cell, thermoelectric generator and/or any other energy source that can be harvested such as a source that produces electromagnetic energy, vibrations, etc. The energy harvesting circuit 110 can be any circuit that receives energy from harvesting source 100 and converts the energy into another form. For example, energy harvesting circuit 110 can receive an input voltage $V_{IN}$ 111 and an input current $I_{IN}$ 112 and send a harvested power $P_H(t)$ 113 and output current $I_H$ 113, with an efficiency $EFF_H$.

Power harvested from the environment ($P_H(t)$ 113) is delivered to a storage node 120 (also referred to herein as "energy storage element" or "storage element"), which stores energy ($E_{Storage}$) for later use in the system. The storage node 120 can be, for example, a battery such as a 1.5 Volt battery. The storage node 120 can have a voltage $V_{CAP}$ 121 and a current $I_{CAP}$ 122, and can be connected to direct current (DC)-DC regulator 130. The DC-DC regulator 130 can receive a current $I_{LOAD}$ 132 at power $P_{LOAD}(t)$ 131, and produce current $I_{VDD}$ 132 and voltage $V_{DD}(s)$ 133, with an efficiency $EFF_R$.

The load circuits 140 in the system can draw, typically through DC-DC regulator 130, current $I_{LOAD}$ 132, which consumes some load power ($P_{LOAD}(t)$ 131) that is drawn from the storage element 120, reducing the energy stored in storage element 120, $E_{Storage}$. Note that a DC-DC regulator is optional and not included in some alternative embodiments. The load circuits 140 can be, for example, any of an analog circuit(s), a digital circuit(s) and/or a radio frequency (RF) circuit(s). The load circuits 140, for another example, can include a processor or integrated circuit (IC) discussed in further detail below in connection with FIGS. 2 and 6. Such a processor or IC can be included, for example, within a system on chip (SoC) that can include other circuits, elements and components.

The amount of energy stored for later use, $E_{Storage}$, is related to the voltage on the energy storage node, $V_{CAP}$ 121. If the storage node 121 is a capacitor with capacitance $C_{Store}$, then $E_{Storage} = 0.5 * C_{Store} * V_{CAP}^2$. A typical set of load circuits has some minimum operating voltage, below which some of the circuits fail to operate correctly. This leads to the implementation of a power-on reset (POR) signal that holds the set of load circuits in a reset state until an adequate voltage supply is available to allow for correct operation. Once a sufficiently high voltage is reached on the supply voltage 133, the POR turns off, allowing the set of load circuits to boot, which is the process of setting up for normal operation (other sources of reset can also lead to boot operation of the set of load circuits). When using a battery, the voltage quickly reaches this functional level and typically stays there for the lifetime of the battery.

Figure 2:
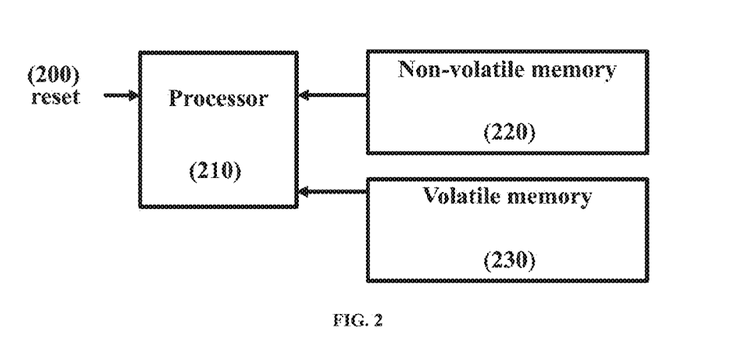
FIG. 2 is a block diagram of a known subsystem that respond to coming out of reset by executing a boot operation using instructions stored in non-volatile memory and/or volatile memory.

FIG. 2 is a block diagram of a known subsystem that responds to coming out of reset by executing a boot operation using instructions stored in non-volatile memory and/or volatile memory. In particular, FIG. 2 represents a known implementation of load circuits (such as load circuits 140 in FIG. 1). Following the example of FIG. 1, reset signal 200 can correspond to the voltage $V_{DD}(s)$ 133 supplied by DC-DC regulator 130 to the load circuits 140. As shown in FIG. 2, processor 210 receives a reset signal 200 and in response, requests and receives boot instructions from non-volatile memory 220 and/or volatile memory 230. Processor 210 can be any one or more processors, microprocessors, application-specific integrated circuit (ASICs), field-programmable gate arrays (FPGAs), or other types of processing units that may interpret and execute instructions. Non-volatile memory 220 can be, for example, a read only memory (ROM), flash memory, erasable programmable read only memory (EPROM), and electrically erasable programmable read only memory (EEPROM). Volatile memory 230 can be, for example, a static random-access memory (SRAM) and dynamic random-access memory (DRAM).

Figure 3:
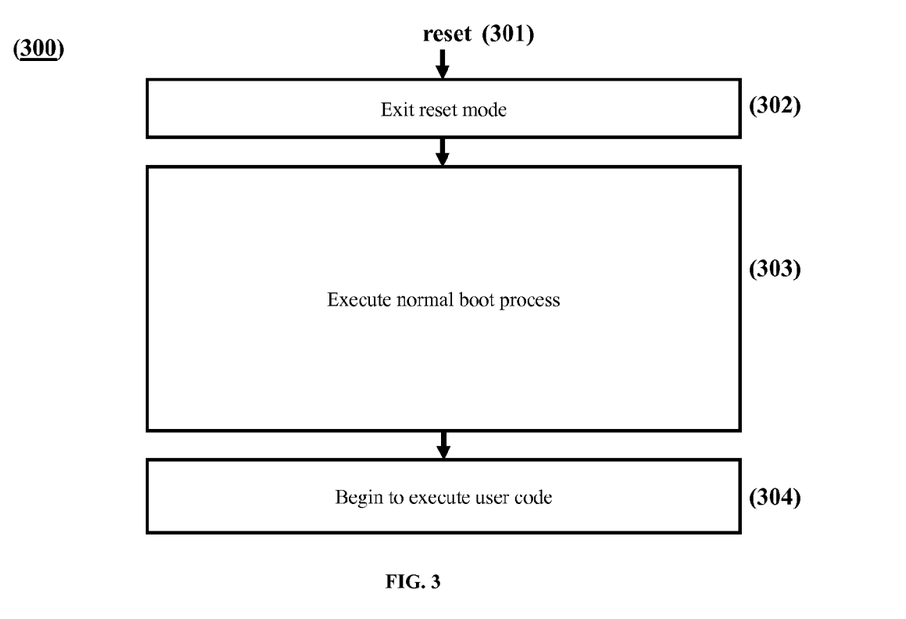
FIG. 3 is a flow diagram showing how a known system responds to exiting reset.

FIG. 3 is a flow diagram showing how a known system responds to exiting reset (e.g., exiting a reset mode). For example, FIG. 3 can represent the process for exiting reset for a system like the system of FIG. 1 where the load circuits 140 of FIG. 1 are implemented in a known manner such as the set of circuits shown in FIG. 2. In this context, exiting reset (or exiting a reset mode) refers to an electronic system having a processor (or IC) that is powering up for the first time or from a state without power (also referred to as a "cold start"). Typically, an electronic system existing reset (or powering up) will execute boot code or a boot sequence of instructions to initialize registers to place the processor in a known state and defined memory map. This can include, for example, clocking speeds, execution mode and other related process-specific items involve definition, such as the memory interface.

After exiting the reset mode at 302, the boot operation at 303 typically includes the execution of multiple blocks of instructions that perform tasks such as the initialization of interrupt handlers or exception vectors, initialization of the stack, initialization of the memory system and of registers, peripheral initialization, configuration of I/O devices, security handling, interrupt enabling, processor mode configuration, variable initialization, (if no application code is available) boot loading of application code from an external source, and finally, jumping to the main application code. The boot process may take inputs from external sources, such as pins that direct the boot into different modes (e.g. user mode vs. safe mode), but once the boot process starts, it typically executes to completion without any attention to power or energy harvesting conditions. After the boot process, the user code is executed at 304.

When a system is operated from wired power or from a battery, no significant reason exists to attend to power conditions during a boot, since the POR transition indicates that a reliable and continuous source of power is available. This assumption does not necessarily hold for a system that operates using harvested energy. For example, the amount of available stored energy may be small, or the rate of energy harvested (harvested power) may be low. In either of these examples, a chip operation such as execution of the boot sequence that consumes substantial energy can drain the stored energy substantially enough to alter the operation of the system. One result of this, for example, would be for the boot sequence to force the chip back into a reset condition by reducing the available energy (and therefore the energy storage voltage) low enough to trigger the reset state.

Figures 4A, 4B, 4C:
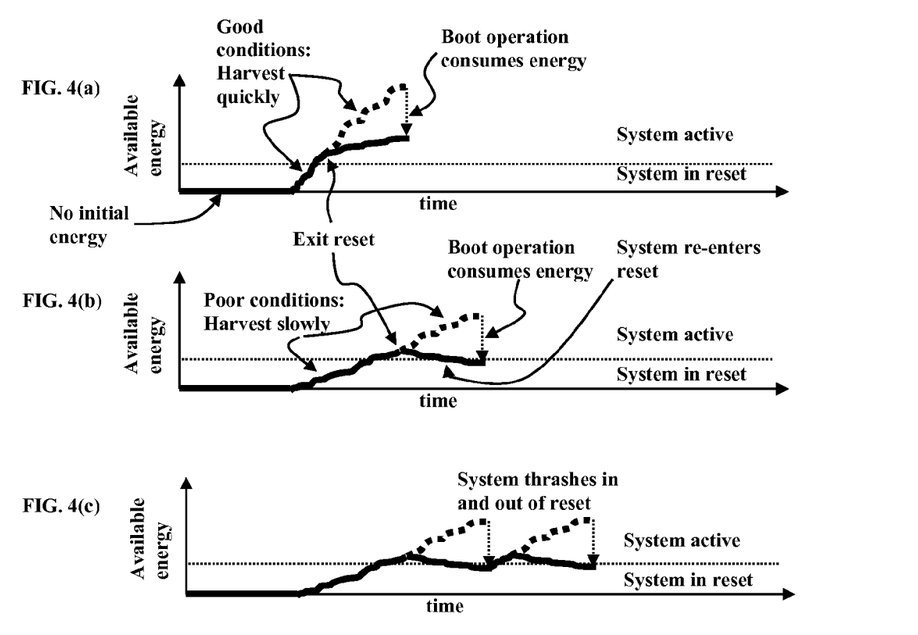
FIGS. 4(a)-4(c) show illustrations of available energy versus time of example scenarios for available energy in energy harvesting systems.

FIG. 4 shows illustrations of available energy versus time of example scenarios for available stored energy in energy harvesting systems having a known implementation of load circuits such as that shown in FIG. 2. The dashed lines show the amount of harvested energy (without consumption by the boot operation); the solid lines show the amount of consumed energy. FIG. 4(*a*) shows how the available energy increases in good harvesting conditions where the harvested energy substantively exceeds the energy consumed by the system. Consequently, the boot operation can proceed uninterrupted. FIG. 4(*b*) illustrates one potential problem that could occur in poor harvesting conditions, as described above. In this case, the power harvesting occurs at a lower rate, so the stored energy increases more slowly with time. When the system exits the reset state and starts the boot sequence, the energy cost of executing the boot sequence exceeds the replenishing energy through power harvesting, causing the stored energy (and therefore the energy storage voltage) to drop until the POR de-asserts, causing the system to reenter the reset state. This type of situation is not a concern for systems that operate from wired power or from a conventional battery. Without proper management of this category of problem, however, a power harvesting system might encounter some scenarios in which it cannot function correctly at all. For example, FIG. 4(*c*) shows how a system might in some scenarios thrash between a reset state and a non-reset state when the energy cost of executing the boot sequence is large compared to the replenishing harvested energy. This could potentially prevent the system from completing the boot sequence for prolonged periods of time.

Thus, a need exists for a method of executing the boot sequence in power harvesting systems that accounts for the power harvesting and energy storage conditions. An apparatus and methods that use information about power harvesting and energy harvesting conditions to alter a power-on sequence or a boot sequence for a power harvesting system is described.

Figure 5:
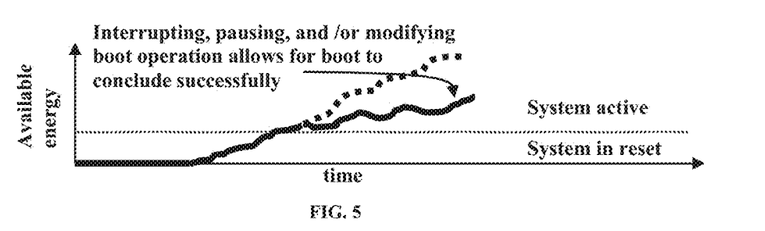
FIG. 5 shows an illustration of the available energy during harvesting operation in poor energy harvesting conditions, when modifying the boot operation (e.g. by interrupting, pausing, or changing the boot process) based on information about the harvesting conditions allows the boot operation to complete successfully.

FIG. 5 shows an illustration of available energy versus time of the available stored energy during harvesting operation during poor energy harvesting conditions, according to an embodiment. More specifically, FIG. 5, shows an illustration of available energy versus time for a system having a modified boot operation (e.g., by interrupting, pausing, or changing the boot process), according to an embodiment. The boot operation can be modified, for example, based on information about the harvesting conditions such that the energy consumption of the boot process is reduced, allowing the harvested power to exceed the consumed power. As a result, the stored energy does not decrease so far that it prevents the boot operation from completing successfully, in contrast to FIGS. 4(b) and 4(c) where the boot operation is interrupted and reset (note the solid line falling below the threshold shown with the horizontal dashed line at which the boot operation is interrupted and reset). Again, the dashed line shows the amount of harvested energy (without consumption by the boot operation); the solid line shows the amount of consumed energy.

Figure 6:
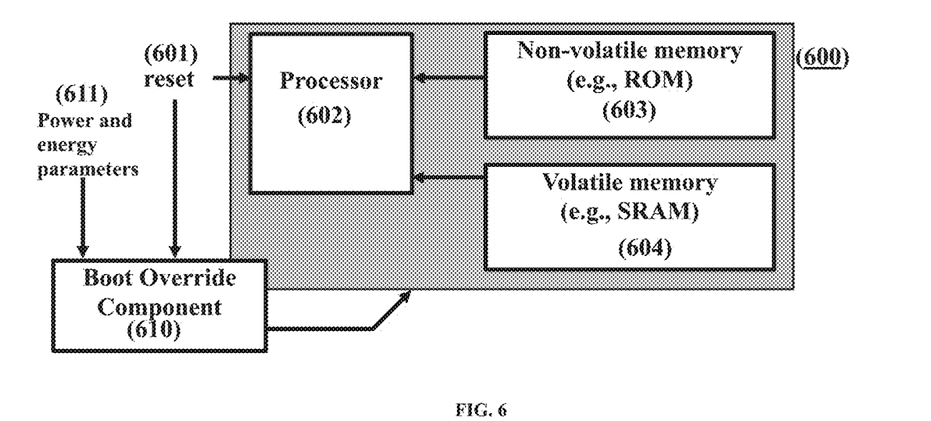
FIG. 6 shows a block diagram of a subsystem that uses information about the power harvesting conditions to alter a reset or boot operation, according to an embodiment.

FIG. 6 shows a block diagram of a subsystem that uses information about the power harvesting conditions to alter a reset or boot operation, according to an embodiment. In particular, subsystem 600 of FIG. 6 represents an implementation of load circuits (such as load circuits 140 in FIG. 1), according to an embodiment. Following the example of FIG. 1, reset signal 601 can correspond to the voltage $V_{DD}(s)$ 133 supplied by DC-DC regulator 130 to the load circuits 140.

As shown in the FIG. 6, the subsystem 600 includes a processor 602 connected or operably coupled to non-volatile memory 603 and volatile memory 604. Processor 602 can be similar to the processor 210 of FIG. 2, and non-volatile memory 603 and volatile memory 604 can be similar to the non-volatile memory 220 and volatile 230, respectively, of FIG. 2. The subsystem of FIG. 6 also includes a boot override component, which is connected or operatively coupled to processor 602, non-volatile memory 602 and/or volatile memory 604. The reset signal 601 is received by processor 602 and boot override component 610. Boot override component 610 also receives power and energy parameters 611.

The boot override component 610 receives as inputs the existing reset signal(s) and parameters related to the power and energy harvesting conditions. The boot override component 610 determines information about the power harvesting, energy harvesting, and energy storage conditions for the system (e.g., the integrated circuit or the system on chip) and uses that information to alter the reset or boot sequence execution. The boot override component 610 can be, for example, a component or module within the subsystem 600 or outside of the subsystem 600, and operatively coupled to the processor 602, non-volatile memory 603 and/or volatile memory 604. Alternatively, the boot override component 600 can be a component or module within the processor 602, non-volatile memory 603 and/or volatile memory 604. The boot override component 610 can be in the form of hardware, firmware or software (stored in memory or executing in hardware/firmware) including for example a block of hardware/firmware or an extra line of code or subroutine of software/firmware stored in memory or executing in hardware.

The power and energy parameters 611 received by and/or the power harvesting conditions computed by the boot override component 610 can include, for example, the state of the system's available energy stored in the energy storage element (e.g., energy storage element 120 in FIG. 1), the power or energy used to perform different portions of the boot process, the value of supply voltage rails in the system (e.g., voltage $V_{DD}(s)$ 133 in FIG. 1), the current drawn by supply voltage rails in the system (e.g., current $I_{VDD}$ 134 in FIG. 1), various derivatives of current drawn by supply voltage rails in the system (e.g., current $I_{VDD}$ 134 in FIG. 1), the value of the voltage on the energy storage node (e.g., voltage $V_{CAP}$ 121 in FIG. 1), various derivatives of the voltage on the energy storage node (e.g., voltage $V_{CAP}$ 121 in FIG. 1), the current delivered to the energy storage node (e.g., current $I_{CAP}$ 122 in FIG. 1), various derivatives of the current delivered to the energy storage node (e.g., current $I_{CAP}$ 122 in FIG. 1), the current drawn from the energy storage node (e.g., current $I_{LOAD}$ 132 in FIG. 1), various derivatives of the current drawn from the energy storage node (e.g., current $I_{LOAD}$ 132 in FIG. 1), the input voltage to the energy harvesting circuit 111, various derivatives of the input voltage to the energy harvesting circuit (e.g., voltage $V_{IN}$ 111 in FIG. 1), the input current to the energy harvesting circuit (e.g., current $I_{IN}$ 112 in FIG. 1), various derivatives of the input current to the energy harvesting circuit (e.g., current $I_{IN}$ 112 in FIG. 1), the harvested power from the energy harvest circuit (e.g., power $P_H(t)$ 113 in FIG. 1), the current delivered from the energy harvesting circuit (e.g., current $I_H$ 114 in FIG. 1), various derivatives of the current delivered from the energy harvesting circuit (e.g., current $I_H$ 114 in FIG. 1), the load power (e.g., load power $P_{LOAD}(t)$ 131 in FIG. 1), outputs from a built-in self-test (not shown), values stored in memory related to prior power transitions (e.g., values stored in memories 220 and/or 230 in FIG. 2), previous or current states of the energy harvesting circuits (e.g., energy harvesting circuit 110 in FIG. 1), or the type of power source (e.g., energy harvesting circuit vs. battery/energy storage element vs. universal serial bus (USB) (not shown)).

In some instances, the boot override component 610 and/or some other component (now shown) acting on the components within the subsystem 600 (that would otherwise execute a normal boot process or boot sequence) may intervene, oversee, stall, interrupt, stop, or re-direct the normal boot process or boot sequence. In other words, the output of the boot override component 610 can cause a change/modification in the boot sequence such that the processor executes the modified boot sequence in response to a boot request. As a result, in some instances, this change/modification in the boot sequence will effectively reduce the current drawn by the load circuits (e.g., current $I_{LOAD}$ 132 in FIG. 1), thereby conserving energy on the energy storage element (e.g., energy storage element 120 in FIG. 1) relative to not performing the change/modification. This may include performing an action to alter the peak load current (e.g., current $I_{LOAD}$ 132 in FIG. 1), the average load current (e.g., current $I_{LOAD}$ 132 in FIG. 1), the power drawn by the load (e.g., load power $P_{LOAD}(t)$ 131 in FIG. 1), or the energy consumed by the load (e.g., the energy consumed by load circuits 140 in FIG. 1). The following discussion provides several examples of the actions that can be performed in response to an instruction (or control signal) sent by the boot override component 610, for example, based on power harvesting conditions associated with an energy harvesting circuit and/or energy storage element (such as the energy harvesting circuit 110 and/or energy storage element 120 of FIG. 1).

In some instances or embodiments, the action performed in response to the power harvesting conditions might make changes to the hardware (e.g., processor 602, non-volatile memory 603 and/or volatile memory 604). Alternatively, the action performed in response to the power harvesting conditions might make changes to the software (e.g., software executing on processor 602, and/or software stored in non-volatile memory 603 and/or volatile memory 604).

In some instances or embodiments, the action performed in response to the power harvesting conditions might make changes to the boot loader options or to the boot mode (e.g., a boot sequence can be segmented and modified to define a set of modified boot sequence segments).

In some instances or embodiments, the action performed in response to the power harvesting conditions might intercept the reset signal and only allow the reset to occur based on power harvesting conditions.

In some instances or embodiments, the action performed in response to the power harvesting conditions might be to pause or stall at different points in normal boot sequence. Alternatively, the action performed in response to the power harvesting conditions might redefine the threshold for starting the boot sequence based on power conditions. For example, multiple thresholds may act as gating signals for subsets of the boot sequence.

In some instances or embodiments, the action performed in response to the power harvesting conditions might modify the output or operation of a memory such as a non-volatile memory (e.g., the non-volatile memory 603 of FIG. 6). This can be accomplished, for example, by defining a modified boot sequence such that a processor/IC executes the modified boot sequence in response to a boot request such that the operation of a memory is modified. For example, the operation of a memory can be modified by pulling at least one pin to a level not determined by the non-volatile memory. In other words, the operation of the memory can be modified by modifying a level of at least one pin of the memory, independent of the operation of the memory. The output of the non-volatile memory might also be changed using a multiplexer (not shown) that replaces the output of the non-volatile memory with a different value. These same techniques can be applied to boot code in volatile memory (e.g., volatile memory 604 of FIG. 6) as well.

In some instances or embodiments, the action performed in response to the power harvesting conditions might be to interrupt or to preempt non-volatile memory access by loading boot code from a new location such as an external source, alternative memory, or different location in the on-chip memory. Alternatively, the action performed in response to the power harvesting conditions can be to interrupt, preempt or alter the non-volatile memory access by controlling the jump operand for a conditional jump(s) or controlling jump locations from the boot code. The control of the jump operand for a conditional jump(s) can be performed, for example, upon execution of a modified boot sequence. Similarly, the control of the jump location can be implemented through a modified boot sequence.

In some instances or embodiments, the action performed in response to the power harvesting conditions might be to alter the initialization of a peripheral component(s), for example by changing the memory-mapped locations associated with that peripheral component(s). Alternatively, the action performed in response to the power harvesting conditions can be to define alternative boot modes for peripheral blocks and to select the boot mode for a peripheral component(s) based on power conditions. For example, if normal operation would configure and enable a peripheral component(s), an alternative mode might configure but not enable the peripheral component(s). In this context, a peripheral component(s) is peripheral in the sense that it is located outside of and separate from the processor, IC or SoC that is performing the method(s) described herein.

In some instances or embodiments, the action performed in response to the power harvesting conditions can change the behavior of the power management unit (PMU) on an SoC to alter its mode or state or control scheme. In other words, the boot override component can modify the operation of the PMU such that the operation associated with a memory is modified to define a modified boot sequence.

In some instances or embodiments, the action performed in response to the power harvesting conditions can be to segment the boot sequence and to allow each segment of the boot sequence to execute depending on some combination of the energy consumed by the execution of that segment of the boot sequence and the available energy. In other words, the boot sequence can be divided into segments to define a set of boot sequence segments, and then the set of boot sequence segments can be modified to define a set of modified boot sequence segments. For example, the set of modified boot sequence segments can be associated with timing information so that the timing of the execution of individual segments is controlled (e.g., a pause can be defined between the execution of adjacent segments). In another example, the set of modified boot sequence segments can be executed such that each boot sequence segment is executed at a time from a set of times. Each time from this set of times can be based on a threshold from a set of thresholds and for that segment and based on an amount of energy available at that time from the energy harvest circuit. Alternatively or in addition, the action performed in response to the power harvesting conditions can be to segment boot sequence and to re-order the execution of the segments of the boot sequence. In other words, the boot sequence can be divided into segments to define a set of boot sequence segments, and then the set of boot sequence segments can be modified to define a set of modified boot sequence segments by reordering at least two boot sequence segments.

In some instances or embodiments, the action performed in response to the power harvesting conditions can be to define alternative boot programs or sub programs and to select the program or subprogram to run based on power conditions. In other words, a boot sequence can be divided into segments to define a set of boot sequence segments, and then the set of boot sequence segments can be modified to define a set of modified boot sequence segments by replacing at least one boot sequence segment with at least two alternative boot sequence segments, one of which will be executed depending on the power conditions. Alternatively, the action performed in response to the power harvesting conditions can be to stop operation of a segment of a boot sequence after it has already started, to roll back to a previous condition, and to re-start the operation, possibly in a delayed or modified state.

The power consumed by memory accesses themselves can be problematic for energy harvesting systems. In some instances or embodiments, the action performed in response to the power harvesting conditions can be control amount of data, rate of data, or pattern of data accessed in a memory (e.g., non-volatile memory 603 or volatile memory 604 of FIG. 6).

Figure 7:
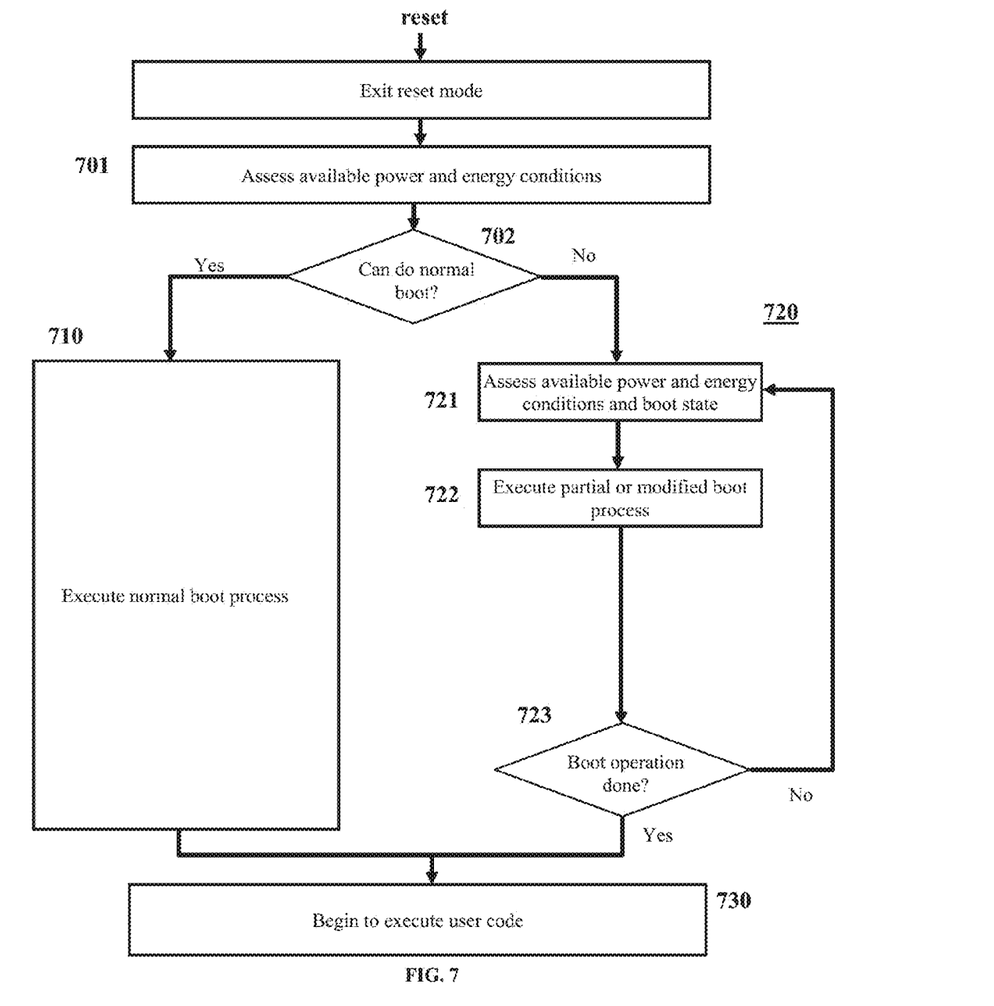
FIG. 7 shows a flow diagram for the operation of a system that uses information about the power harvesting conditions to alter the reset or boot operation, according to an embodiment.

FIG. 7 shows a flow diagram for the operation of a system that uses information about the power harvesting conditions to alter the reset or boot operation. Similar to the discussion above in connection with FIG. 3, FIG. 7 refers to a process after exiting reset (or exiting a reset mode) by an electronic system having a processor (or IC) that is powering up for the first time or from a state without power (also referred to as a "cold start"). Here, however, the processor can involve altering the reset or boot operation, for example, by a pre-empting or preventing the boot process itself (e.g., pre-empting, preventing, or modifying the boot sequence of instructions). For example, analog circuits may operate before the processor/IC has booted such that the analog circuits cause an alteration or modification to the boot sequence and the processor/IC executes this modified boot sequence upon power up or initial operational. This is in contrast to known systems have perform conventional power management techniques after the processor/IC has booted (e.g., after executing the boot sequence of instructions).

More specifically, in contrast to flow diagram for a known boot process (FIG. 3), this altered methodology makes a decision 702 about whether the normal boot process can proceed based in part on an assessment of power harvesting conditions 701. If so, then the normal boot process executes 710. If not, then an altered boot process executes 720, in which additional decisions are made to adjust the boot process based on power harvesting conditions until it completes. The altered boot process 720 includes assessing available power, energy conditions and boot state at 721, executing partial or modified boot process at 722, and determine whether the boot operation is done at 723. If the boot operation is done at 723, then execution of the user code is started at 730. If the boot operation is not done at 723, then the altered boot process 720 repeats starting at 721.

In some instances, the process of FIG. 7 can be applied to an energy harvesting wireless sensor having an energy harvesting and power management block (e.g., energy harvesting circuit 110, energy storage element 120, and/or DC-DC regulator 130 in FIG. 1), a processor, and a radio (e.g., the processor and radio collectively be represented by load circuits 140 in FIG. 1). A boot override component (e.g., boot override component 610 of FIG. 6) can perform some of the process shown in FIG. 7. For example, when the reset signal is de-asserted, a boot override component can assess the power harvesting conditions and determine at 702 if a normal boot can occur, for example, by comparing the available stored energy and rate of incoming power to the computed energy consumption required to boot. If the available energy is higher, then a normal boot process occurs at 710. Otherwise, the boot override component causes the altered boot process at 720 to be performed. For example, the altered boot process can replace the jump locations of code emerging from the non-volatile memory for different subroutines in the boot process based on an ongoing assessment of available energy at 721.

As used in this specification, the singular forms "a," "an" and "the" include plural referents unless the context clearly dictates otherwise. Thus, for example, the term "an electrical component" is intended to mean a single electrical component or a combination of electrical components.

While various embodiments have been described above, it should be understood that they have been presented by way of example only, and not of limitation. Likewise, the various diagrams may depict an example architectural or other configuration for the embodiments, which is done to aid in understanding the features and functionality that can be included. The disclosure is not restricted to the illustrated example architectures or configurations, but can be implemented using a variety of alternative architectures and configurations. Additionally, it should be understood that the various features and functionality described in one or more of the individual embodiments are not limited in their applicability to the particular embodiment with which they are described, but instead can be applied, alone or in some combination, to one or more of the other embodiments, whether or not such embodiments are described and whether or not such features are presented as being a part of a described embodiment. Thus the breadth and scope of the disclosure should not be limited by any of the above-described exemplary embodiments.

While various embodiments have been described above, it should be understood that they have been presented by way of example only, and not limitation. Where methods described above indicate certain events occurring in certain order, the ordering of certain events may be modified.

What is claimed is:

1. An apparatus, comprising:
an energy harvesting circuit;
an integrated circuit (IC) operatively coupled to the energy harvesting circuit; and
a boot override component configured to receive information associated with energy harvested by the energy harvesting circuit, the boot override component configured to, in response to a boot request for the IC and based on the information, (1) segment a boot sequence of the IC to define a plurality of boot sequence segments, and (2) modify the plurality of boot sequence segments to define a plurality of modified boot sequence segments such that the IC executes the plurality of modified boot sequence segments in response to the boot request.

2. The apparatus of claim 1, wherein the boot override component is configured to modify the plurality of boot sequence segments to define the plurality of modified boot sequence segments by defining a pause between at least two adjacent modified boot sequence segments from the plurality of modified boot sequence segments that was not included in the plurality of boot sequence segments.

3. The apparatus of claim 1, wherein:
the boot override component is configured to define the plurality of modified boot sequence segments such that the IC executes, in response to the boot request, each modified boot sequence segment from the plurality of modified boot sequence segments at a time from a plurality of times based on (1) a plurality of thresholds associated with that modified boot sequence segment, and (2) an amount of energy available at that time and from the energy harvesting circuit.

4. The apparatus of claim 1, wherein:
each modified boot sequence segment from the plurality of modified boot sequence segments is associated with an amount of energy to execute that modified boot sequence segment,
the boot override component is configured to define the plurality of modified boot sequence segments such that the IC executes, in response to the boot request, each modified boot sequence segment from the plurality of modified boot sequence segments at a time from a plurality of times based on (1) the amount of energy associated with that modified boot sequence segment, and (2) an amount of energy available at that time and from the energy harvesting circuit.

5. The apparatus of claim 1, wherein the boot override component is configured to modify the plurality of boot sequence segments to define the plurality of modified boot sequence segments by reordering at least two boot sequence segments from the plurality of boot sequence segments.

6. The apparatus of claim 1, wherein:
the boot override component is configured to modify the plurality of boot sequence segments to define the plurality of modified boot sequence segments by replacing at least one boot sequence segment from the plurality of boot sequence segments with a first set of alternative boot sequence segments and a second set of alternative boot sequence segments, the first set of alternative boot sequence segments and the second set of alternative boot sequence segments included within the plurality of modified boot sequence segments.

7. The apparatus of claim 1, wherein the boot override component is configured to define the plurality of modified boot sequence segments such that the IC executes, in response to the boot request, (1) a stop operation during execution of the plurality of modified boot sequence segments, (2) a roll back operation to a prior condition of the execution of the plurality of modified boot sequence segments, and (3) a restart operation of the execution of the plurality of modified boot sequence segments.

8. An apparatus, comprising:
  an energy harvesting circuit;
  an integrated circuit (IC) operatively coupled to the energy harvesting circuit, the IC configured to be operatively coupled to a peripheral component; and
  a boot override component configured to receive information associated with energy harvested by the energy harvesting circuit, the boot override component configured to, in response to a boot request for the IC and based on the information, cause an operation associated with the peripheral component to be modified such that a modified boot sequence is defined and such that the IC executes the modified boot sequence in response to the boot request.

9. The apparatus of claim 8, wherein the energy harvesting circuit and the IC are included within a system on chip (SoC), the SoC not including the peripheral component.

10. The apparatus of claim 8, wherein the boot override component is configured to cause an operation associated with the peripheral component to be modified including altering an initialization of the peripheral component.

11. The apparatus of claim 8, wherein the boot override component is configured to cause an operation associated with the peripheral component to be modified by changing a value of a memory that is associated with a mapped location of the peripheral component.

12. The apparatus of claim 8, wherein:
  the boot override component is configured to cause an operation associated with the peripheral component to be modified by replacing at least one boot sequence segment from a plurality of boot sequence segments with a first set of alternative boot sequence segments and a second set of alternative boot sequence segments to define a plurality of modified boot sequence segments,
  the IC configured to execute the plurality of modified boot sequence segments in response to a boot request for the IC.

13. The apparatus of claim 12, wherein:
  the first set of alternative boot sequence segments and the second set of alternative boot sequence segments each is associated with an amount of energy to execute that set of alternative boot sequence segments, and
  the boot override component is configured to define the plurality of modified boot sequence segments such that the IC executes, in response to the boot request, either the first set of alternative boot sequence segments or the second set of alternative boot sequence segments at a time from a plurality of times based on (1) the amount of energy associated with that set of alternative boot sequence segments, and (2) an amount of energy available at that time and from the energy harvest circuit.

\* \* \* \* \*